United States Patent
Santhanam et al.

(10) Patent No.: US 10,595,214 B2
(45) Date of Patent: Mar. 17, 2020

(54) IDENTIFYING, AVOIDING, AND/OR ALLOWING LIMITED ACCESS TO SUB-OPTIMAL CELLS

(71) Applicant: QUALCOMM Incorporated, San Diego, CA (US)

(72) Inventors: Arvind Santhanam, San Diego, CA (US); Francesco Grilli, La Jolla, CA (US); Simon Walke, Basingstoke (GB); Venkata Potnuru, Hyderabad (IN); Vikas Gulati, Hyderbad (IN); Neha Goel, London (GB)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 15/211,477

(22) Filed: Jul. 15, 2016

(65) Prior Publication Data

US 2017/0055164 A1   Feb. 23, 2017

(30) Foreign Application Priority Data

Aug. 19, 2015   (IN) .......................... 4336/CHE/2015

(51) Int. Cl.
*H04W 24/02* (2009.01)
*H04W 48/10* (2009.01)
(Continued)

(52) U.S. Cl.
CPC .......... *H04W 24/02* (2013.01); *H04L 63/101* (2013.01); *H04W 36/00* (2013.01); *H04W 48/00* (2013.01);
(Continued)

(58) Field of Classification Search
CPC combination set(s) only.
See application file for complete search history.

(56) References Cited

U.S. PATENT DOCUMENTS

| 9,049,651 B2 | 6/2015 | Meylan et al. |
| 2006/0040700 A1 | 2/2006 | Roberts et al. |

(Continued)

FOREIGN PATENT DOCUMENTS

| EP | 1628497 A1 | 2/2006 |
| GB | 2466452 A | 6/2010 |
| WO | WO08025003 | 2/2008 |

OTHER PUBLICATIONS

ISA/EP, International Search Report and Written Opinion of the International Searching Authority, Int'l Application No. PCT/US2016/042799, dated Sep. 22, 2016, European Patent Office, Rijswijk, NL, 19 pgs.

(Continued)

*Primary Examiner* — Yee F Lam
(74) *Attorney, Agent, or Firm* — Holland & Hart LLP

(57) ABSTRACT

Methods, systems, apparatuses, and devices are described for managing wireless communication at a user equipment (UE). An exemplary method includes adding an identifier of a cell to a sub-optimal cell list based at least in part on a cell classification determination made by the UE, and avoiding a cell access procedure for the cell based at least in part on inclusion of the identifier in the sub-optimal cell list. Another exemplary method includes maintaining a sub-optimal cell list and an associated priority service exception list, initiating a service on the priority service exception list, identifying inclusion of a cell on the sub-optimal cell list, where the cell is associated with a cell access procedure initiated for the service, and accessing the cell included in the sub-optimal cell list based at least in part on inclusion of the service in the priority service exception list.

21 Claims, 11 Drawing Sheets

(51) Int. Cl.
  *H04W 36/00* (2009.01)
  *H04W 48/00* (2009.01)
  *H04W 28/02* (2009.01)
  *H04W 88/02* (2009.01)
  *H04W 84/04* (2009.01)
  *H04L 29/06* (2006.01)
  *H04L 12/26* (2006.01)

(52) U.S. Cl.
  CPC ............ *H04W 48/10* (2013.01); *H04L 43/16* (2013.01); *H04W 28/0268* (2013.01); *H04W 84/042* (2013.01); *H04W 88/02* (2013.01)

(56) References Cited

U.S. PATENT DOCUMENTS

| | | |
|---|---|---|
| 2007/0037577 A1 | 2/2007 | Dalsgaard et al. |
| 2009/0047960 A1* | 2/2009 | Gunnarsson ......... H04J 11/0093 455/436 |
| 2009/0047968 A1* | 2/2009 | Gunnarsson .......... H04W 48/12 455/446 |
| 2010/0184426 A1 | 7/2010 | Hedberg |
| 2010/0323663 A1 | 12/2010 | Vikberg et al. |
| 2013/0322234 A1 | 12/2013 | Mohseni et al. |
| 2014/0073286 A1 | 3/2014 | Gholmieh et al. |
| 2015/0264618 A1* | 9/2015 | Jung .................... H04W 48/20 455/436 |

OTHER PUBLICATIONS

"3rd Generation Partnership Project; Technical Specification Group Radio Access Network; UE Procedures in Idle Mode(3G TS 25 .304 version 3.0.0ed)," 3GPP Draft; 25304-300 FFS Marked, Mobile Competence Centre ; 650, Route Des Lucioles ; F-06921 Sophia-Antipolis Cedex ; France, vol. RAN WG2, No. Sophia Antipolis, France; 19991126, Nov. 26, 1999, 36 pages, XP050114115, 3rd Generation Partnership Project (3GPP).

* cited by examiner

IDENTIFYING, AVOIDING, AND/OR ALLOWING LIMITED ACCESS TO SUB-OPTIMAL CELLS

CROSS REFERENCES

The present application for patent claims priority to Indian Provisional Patent Application No. 4336/CHE/2015 by Santhanam et al., entitled "Methods for Identifying, Avoiding, and Allowing Limited Access for Sub-Optimal Cells," filed Aug. 19, 2015, assigned to the assignee hereof.

BACKGROUND

Field of the Disclosure

The present disclosure, for example, relates to wireless communication systems, and more particularly to identifying, avoiding, and/or allowing limited access to sub-optimal cells.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless communication system may include a number of base stations (e.g., a base station forming part or all of an evolved Node B (eNB)) or wireless local area network (WLAN) access points (APs) capable of supporting wireless communication for various user equipment (UEs). A UE may communicate with a base station or WLAN AP via downlink and uplink. The downlink (or forward link) refers to the communication link from the base station or WLAN AP to the UE, and the uplink (or reverse link) refers to the communication link from the UE to the base station or WLAN AP.

Some wireless communication systems may include cells (e.g., base stations or APs) that perform sub-optimally. In some cases, a UE may determine a sub-optimal cell is a suitable cell to associate with or camp on (e.g., because a radio frequency (RF) link established with the sub-optimal cell is strong). However, the sub-optimal cell may be unable to obtain service (or adequate service) from a network, or may provide fewer services or capabilities, or a lower service level (e.g., a lower Quality of Service (QoS)) than a neighbor cell. A UE's association with or camping on the cell may therefore provide a user of the UE with a poor user experience, and support for improved communications between a UE and cells is desired.

SUMMARY

The described features generally relate to one or more methods, systems, apparatuses, and/or devices for identifying, avoiding, and/or allowing limited access to sub-optimal cells. In some examples, a UE may identify a sub-optimal cell based at least in part on a cell classification determination made by the UE. The cell classification determination may be based, for example, on one or more of a determination that a service, a service level, a capability, or a combination thereof is not supported at the cell, and/or factors such as statistical information, crowd-sourced information, performance metric(s), and/or speed test(s) collected for one or more cells, which information may indicate the cell is associated with sub-optimal performance. In some examples, the cell may be classified as sub-optimal even though the UE can maintain a strong RF link with the cell. Upon classifying the cell as sub-optimal, the UE may update a sub-optimal cell list with an identifier of the cell, and thereafter avoid (e.g., not continue, not perform, or terminate) a cell access procedure for the cell.

In some examples, a UE may allow limited access to a cell included in a sub-optimal cell list. For example, the UE may maintain a priority service exception list in addition to the sub-optimal cell list, and when a service included in the priority service exception list is initiated at the UE, the UE may access a cell included in the sub-optimal cell list (e.g., to support the service) despite the cell being included in the sub-optimal cell list.

A method for wireless communication at a UE is described. The method may include adding an identifier of a cell to a sub-optimal cell list based at least in part on a cell classification determination made by the UE, and avoiding a cell access procedure for the cell based at least in part on inclusion of the identifier in the sub-optimal cell list.

An apparatus for wireless communication at a UE is described. The apparatus may include a processor, memory in electronic communication with the processor, and one or more instructions stored in the memory. The one or more instructions may be executable by the processor to cause the apparatus to add an identifier of a cell to a sub-optimal cell list based at least in part on a cell classification determination made by the UE, and avoid a cell access procedure for the cell based at least in part on inclusion of the identifier in the sub-optimal cell list.

Another apparatus for wireless communication at a UE is described. The apparatus may include means for adding an identifier of a cell to a sub-optimal cell list based at least in part on a cell classification determination made by the UE, and means for avoiding a cell access procedure for the cell based at least in part on inclusion of the identifier in the sub-optimal cell list.

A non-transitory computer-readable medium for wireless communication at a UE is described. The non-transitory computer-readable medium may include one or more instructions executable to add an identifier of a cell to a sub-optimal cell list based at least in part on a cell classification determination made by the UE, and avoid a cell access procedure for the cell based at least in part on inclusion of the identifier in the sub-optimal cell list.

Some examples of the method, apparatuses, or non-transitory computer-readable medium may include operations, features, means, or one or more instructions for determining that at least one of a service, a service level, a capability, or a combination thereof is not supported at the cell, and the cell classification determination made by the UE may be based at least in part on the determining. In some examples of the method, apparatuses, or non-transitory computer-readable medium, determining that a service level is not supported at the cell may include operations, features, means, or one or more instructions for determining a throughput or reliability associated with the cell fails to satisfy a first threshold, a radio link failure (RLF) rate associated with the cell satisfies a second threshold, an audio delay or audio jitter associated with the cell satisfies a third threshold, a real-time service delay or jitter associated with the cell satisfies a fourth threshold, or a combination thereof. In some examples of the method, apparatuses, or non-transitory computer-readable medium, determining that a capability is not supported at the cell may include operations, features, means, or one or more instructions for determining that a multiple-input multiple-output (MIMO) capability is not supported at the cell, a carrier aggregation (CA) capability is not supported at the cell, or a combination thereof.

In some examples of the method, apparatuses, or non-transitory computer-readable medium, the cell classification determination may be based at least in part on statistical information collected for one or more cells at the UE over time, crowd-sourced information received for one or more cells at the UE, a performance metric determined for one or more cells by the UE, a speed test performed for one or more cells by the UE, or a combination thereof. Some examples of the method, apparatuses, or non-transitory computer-readable medium may include operations, features, means, or one or more instructions for identifying a network operator associated with the cell, and avoiding the cell access procedure for the cell may be based at least in part on association of the sub-optimal cell list or one or more identifiers in the sub-optimal cell list with the network operator. Some examples of the method, apparatuses, or non-transitory computer-readable medium may include operations, features, means, or one or more instructions for identifying a subscriber identity module (SIM) associated with the cell access procedure, and avoiding the cell access procedure for the cell may be based at least in part on association of the sub-optimal cell list with the SIM. Some examples of the method, apparatuses, or non-transitory computer-readable medium may include operations, features, means, or one or more instructions for identifying a geographical region in which the cell access procedure is initiated, and avoiding the cell access procedure for the cell may be based at least in part on association of the sub-optimal cell list or one or more identifiers in the sub-optimal cell list with the geographical region. Some examples of the method, apparatuses, or non-transitory computer-readable medium may include operations, features, means, or one or more instructions for identifying a physical cell identifier (PCI) associated with the cell, and barring access to cells associated with the PCI, for a period of time, upon avoiding the cell access procedure.

Some examples of the method, apparatuses, or non-transitory computer-readable medium may include operations, features, means, or one or more instructions for accessing the cell based at least in part on determining that the sub-optimal cell list does not include the identifier of the cell, or that a priority service exception list includes the identifier of the cell. In some examples of the method, apparatuses, or non-transitory computer-readable medium, the cell access procedure may include one of an initial access procedure, a high priority public land mobile network (HPPLMN) scan, a manual public land mobile network (PLMN) scan, a manual PLMN selection, a manual closed subscriber group (CSG) selection, a network-initiated cell redirection, a UE-initiated cell redirection, a cell search, or camping on the cell in an idle state.

Another method for wireless communication at a UE is described. The method may include maintaining a sub-optimal cell list and an associated priority service exception list, initiating a service included in the priority service exception list, identifying inclusion of a cell on the sub-optimal cell list, where the cell is associated with a cell access procedure initiated for the service, and accessing the cell included in the sub-optimal cell list based at least in part on inclusion of the service in the priority service exception list.

Another apparatus for wireless communication at a UE is described. The apparatus may include a processor, memory in electronic communication with the processor, and one or more instructions stored in the memory. The one or more instructions may be executable by the processor to cause the apparatus to maintain a sub-optimal cell list and an associated priority service exception list, initiate a service included in the priority service exception list, identify inclusion of a cell on the sub-optimal cell list, where the cell is associated with a cell access procedure initiated for the service, and access the cell included in the sub-optimal cell list based at least in part on inclusion of the service in the priority service exception list.

Another apparatus for wireless communication at a UE is described. The apparatus may include means for maintaining a sub-optimal cell list and an associated priority service exception list, means for initiating a service included in the priority service exception list, means for identifying inclusion of a cell on the sub-optimal cell list, where the cell is associated with a cell access procedure initiated for the service, and means for accessing the cell included in the sub-optimal cell list based at least in part on inclusion of the service in the priority service exception list.

Another non-transitory computer-readable medium for wireless communication at a UE is described. The non-transitory computer-readable medium may include one or more instructions executable by a processor to maintain a sub-optimal cell list and an associated priority service exception list, initiate a service included in the priority service exception list, identify inclusion of a cell on the sub-optimal cell list, where the cell is associated with a cell access procedure initiated for the service, and access the cell included in the sub-optimal cell list based at least in part on inclusion of the service in the priority service exception list.

In some examples of the method, apparatuses, or non-transitory computer-readable medium, the priority service exception list may include an emergency call or a call associated with a priority level satisfying a threshold. In some examples of the method, apparatuses, or non-transitory computer-readable medium, accessing the cell may be based at least in part on non-receipt of system information from a network indicating access to the cell is barred, the UE operating in a limited service mode, a universal subscriber identity module (USIM) of the UE being invalidated for evolved packet system (EPS) services, non-availability of an alternative cell, or a combination thereof. In some examples of the method, apparatuses, or non-transitory computer-readable medium, accessing the cell may include operations, features, means, or one or more instructions for camping on the cell in an idle state.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described for identifying, avoiding, and/or allowing limited access to sub-optimal cells (e.g., cells with certain undesirable communication characteristics, certain cell classifications, etc.). Wireless communication systems are expanding at fast rates. In some environments (e.g., in some countries and/or geographical regions), equipment such as base stations, access points, communication links (e.g., cables), and/or other networking devices or components may not be upgraded or repaired on a timely basis, thereby leading to sub-optimal cells. When a UE associates with or camps on a sub-optimal cell, the UE may believe the sub-optimal cell is a suitable cell (e.g., because an RF link established with the sub-optimal cell is strong). However, the sub-optimal cell may be unable to obtain service (or adequate service, or a desired service) from a network, may provide fewer services or capabilities, or may provide a lower service level than a neighbor cell. A UE's association with or camping on the sub-optimal cell may therefore provide a user of the UE with a poor user experience. The poor user experience may be especially noticeable for services such as mobile-terminated (MT) calls and data calls (e.g., video calls). In some cases, a user of the UE may be provided with a better user experience by avoiding a cell access procedure for an identified sub-optimal cell, or by only allowing cell access procedures for an identified sub-optimal cell for a limited set of priority services (e.g., an emergency call or a high priority call).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
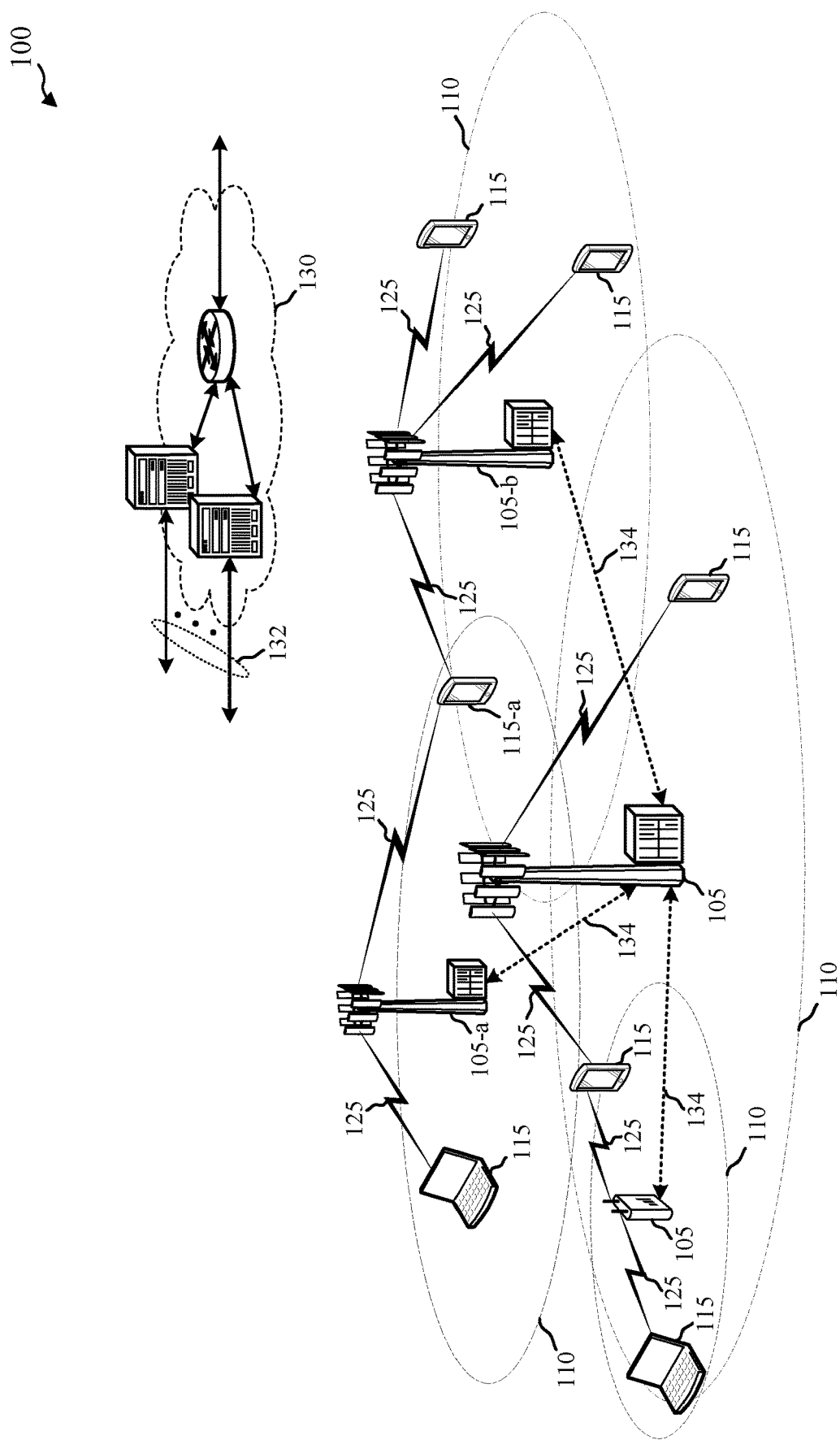
FIG. 1 illustrates an example of a wireless communication system that supports identifying, avoiding, and/or allowing limited access to sub-optimal cells, in accordance with one or more aspects of the present disclosure.

FIG. 1 illustrates an example of a wireless communication system 100, in accordance with one or more aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

Base stations 105 may wirelessly communicate with the UEs 115 (e.g., using various RATs or wireless technologies) via one or more base station antennas. Each base station 105 may provide communication coverage for a respective geographic coverage area 110. For example, each base station 105 may provide communication coverage for a macro cell, a small cell, or other types of cell. In some examples, base stations 105 may be macro cells, small cells, hot spots, or the like. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, a base station 105 may be referred to as a base transceiver station, a radio base station, an access point, a radio transceiver, a NodeB, an evolved NodeB (eNB), a Home NodeB, or a Home eNodeB. A base station 105 may also be referred to as a Radio Network Controller ("RNC"), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other suitable terminology.

In some examples, the wireless communication system 100 may include an LTE/LTE-A network. In LTE/LTE-A networks, the term eNB may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of things (IoT) device, an Internet of Everything (IoE) device, a machine type communication (MTC) device, an appliance, an automobile, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some cases, the wireless communication system 100 may operate with a mix of cells that are suitable for a UE 115 and sub-optimal for the UE 115. For example, the UE 115-a may determine that a first cell associated with the base station 105-a is suitable for the UE 115-a, while a second cell associated with the base station 105-b is sub-optimal for the UE. Classifications of the first and second cells as suitable and sub-optimal, respectively, may be based on classification determinations made by the UE 115-a and/or remote devices (e.g., other UEs 115 and/or base stations 105). Upon classifying the second cell as sub-optimal, the UE 115-a may avoid some or all cell access procedures for the second cell. For example, the UE 115-a may avoid the following cell access procedures for the second cell: a HPPLMN scan, a manual PLMN scan, a manual PLMN selection, a manual CSG selection, a network-initiated cell redirection, a UE-initiated cell redirection, a cell search, camping in an idle state, and/or the like. However, in some examples, the UE 115-a may access the second cell, despite the second cell being sub-optimal, if the second cell is being accessed to support a service included in a priority service exception list. Services included in the priority service exception list may include, for example, an emergency call, a warning system broadcast, a call associated with a priority level satisfying a threshold, and/or the like.

Figure 2:
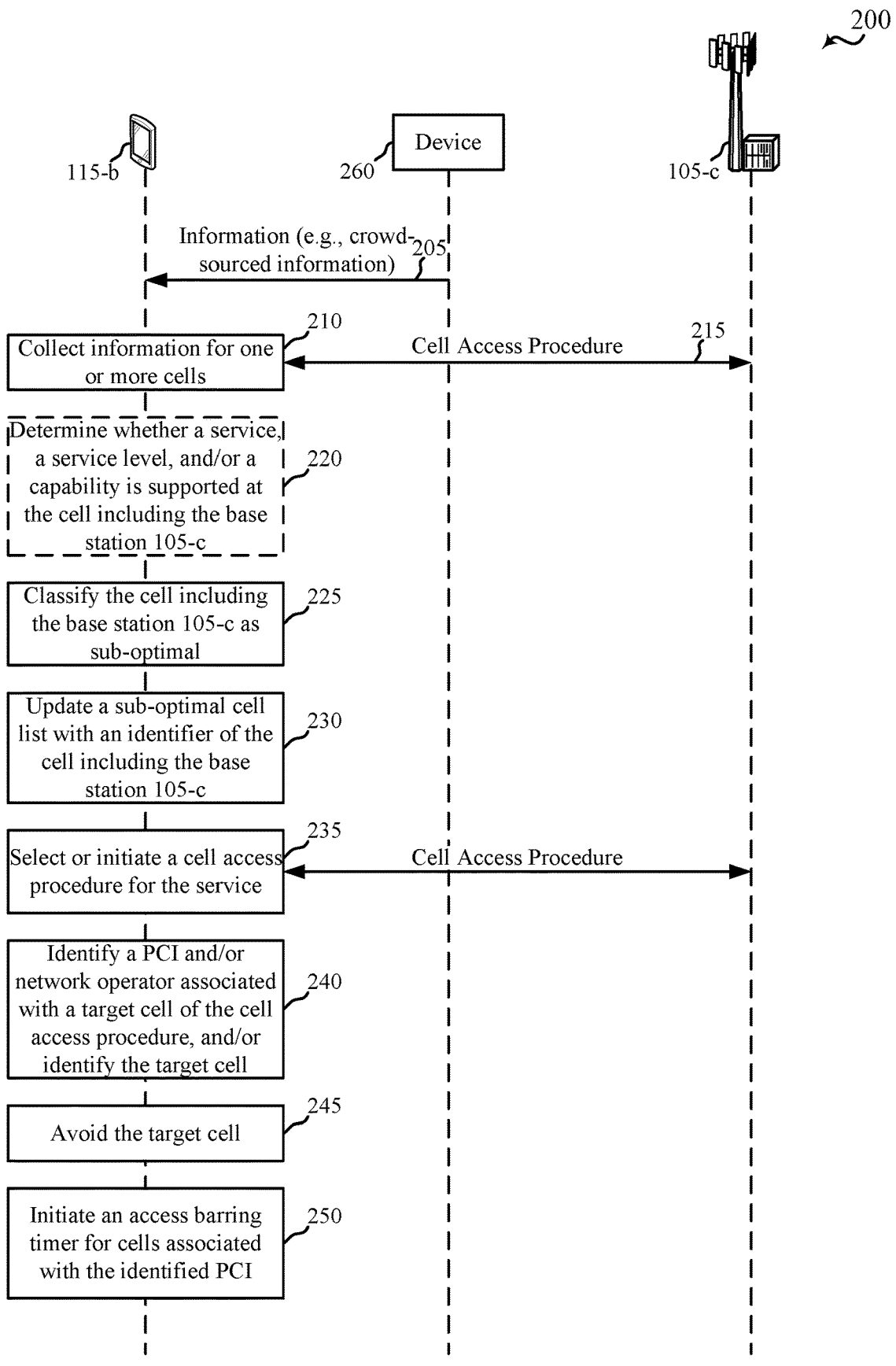
FIG. 2 shows a communications procedure in which sub-optimal cells are identified and avoided by a UE, in accordance with one or more aspects of the present disclosure.

FIG. 2 shows a communications procedure 200 in which sub-optimal cells are identified and avoided by a UE, in accordance with one or more aspects of the present disclosure. Communication messages of the communications procedure 200 may be transmitted between a base station 105-c, a UE 115-b, and a device 260. The base station 105-c may be an example of aspects of one or more of the base stations 105 described with reference to FIG. 1, and the UE 115-b may be an example of aspects of one or more of the UEs 115 described with reference to FIG. 1. The device 260 may be an example of aspects of one or more of the base stations 105 or UEs 115 described with reference to FIG. 1, some other centralized device such as a core network device.

At 205, the UE 115-b may receive information, for example, from the device 260. The information may include, for example, crowd-sourced information for one or more cells. In some cases, the one or more cells associated with the information may include a cell corresponding to the base station 105-c. The information may include information collected or determined by the UE 115-b, such as information described with reference to steps 210 or 215, which was forwarded to the device 260. In some examples, the device 260 may obtain the crowd-sourced information from a server, or the device 260 may be or include a core network device such as a network server. In some examples, the crowd-sourced information may be received at or obtained by the UE 115-b using a peer-to-peer (P2P) mesh networking protocol (e.g., a gossip protocol, a multicast tree, etc.).

At 210, the UE 115-b may collect information for one or more cells. In some cases, the information may include statistical information for one or more cells. In some cases, the statistical information may be collected over time (e.g., on a time scale of hours, days, weeks, etc.). In some examples, the statistical information may be sorted based on time-of-day, location, and/or other parameters. The UE 115-b may additionally or alternatively determine a performance metric (e.g., a communications throughput) for one or more cells. The UE 115-b may additionally or alternatively probe one or more cells (e.g., perform a communications speed test for one or more cells). In some examples, the one or more cells for which the UE 115-b is collecting data may include a cell corresponding to the base station 105-c.

In some examples, the collected information may be based at least in part on communications (e.g., an initiation of a cell access procedure 215) with the base station 105-c. In some examples, a cell access procedure 215 may include an initial access procedure, a HPPLMN scan, a manual PLMN scan, a manual PLMN selection, a manual CSG selection, a network-initiated cell redirection, a UE-initiated cell redirection, a cell search, camping in an idle state, and/or the like.

At 220, the UE may determine whether a service, a service level, and/or a capability is supported at the cell including the base station 105-c. In some examples, determining that a service level is not supported at the cell may include determining that a throughput or reliability associated with the cell fails to satisfy a first threshold (e.g., determining that a throughput is too low). Determining that a service level is not supported at the cell may additionally or alternatively include determining that an RLF rate associated with the cell satisfies a second threshold (e.g., determining that an RLF rate is too high). Determining that a service level is not supported at the cell may additionally or alternatively include determining that an audio delay and/or audio jitter associated with the cell satisfies a third threshold (e.g., determining that an audio delay is too long and/or jitter for voice calls or video calls is too high), and/or determining that a real-time service delay and/or jitter associated with the cell satisfies a fourth threshold (e.g., determining that a real-time delay is too long and/or jitter is too high). In some examples, determining that a service level is not supported at the cell may additionally or alternatively include determining that no service is supported. In some examples, determining that a service level is not supported at the cell may additionally or alternatively include determining that the service level is lower than a service level of a neighbor cell. In some examples, determining that a capability is not supported at the cell may include determining that a MIMO capability is not supported at the cell and/or determining that a CA capability is not supported at the cell.

At 225, and based at least in part on determining that the service, the service level, or the capability is not supported at the cell corresponding to the base station 105-c, and/or based at least in part on other factors (e.g., statistical information, crowd-sourced information, performance metric(s), and/or speed test(s) collected for one or more cells indicating the cell is associated with sub-optimal performance), the UE 115-b may classify the cell as sub-optimal. In some examples, the cell may be classified as sub-optimal even though the UE 115-b can maintain a strong RF link with the cell (e.g., because the cell does not otherwise support the service, the service level, or the capability). At 230, the UE 115-b may update a sub-optimal cell list with an identifier of the cell (e.g., add the identifier of the cell to the sub-optimal cell list) based at least in part on the classification determination. The UE 115-b may update the sub-optimal cell list with identifiers of cells identified by a network operator or other remote sources. In some examples, a network operator may provide updates to be applied to the sub-optimal cell list, such as identifiers of cells to be added to or removed from the sub-optimal cell list. In some examples, the updates may be provided to the UE 115-b using open mobile alliance device management (OMA-DM) or other mechanisms. In some examples the identifier may be, or include (e.g., via a mapping between different identifiers of the cell) a physical layer identifier (e.g., a physical cell identifier (PCI), an L1 identifier, etc.) which as is understood may be decoded at a relatively lower protocol layer (e.g., a PHY layer, etc.).

At 235, the UE 115-b may select or initiate a cell access procedure. In some examples, the cell access procedure may be initiated for a service initiated at the UE 115-b. In some examples, the cell access procedure may include an initial access procedure, a HPPLMN scan, a manual PLMN scan, a manual PLMN selection, a manual CSG selection, a network-initiated cell redirection, a UE-initiated cell redirection, a cell search, camping in an idle state, and/or the like. The cell access procedure at 235 may be performed to generally access a network, and may be performed within a geographic coverage area of the base station 105-c, which was previously determined to be suboptimal.

At 240, the UE 115-b may identify a physical cell identifier (PCI) and/or network operator associated with a target cell of the cell access procedure, and/or the UE 115-b may identify the target cell (e.g., by identifying a cell identity (Cell ID) or other identifier of the target cell). The UE 115-b may also (and optionally) identify a SIM, and/or a geographical region associated with the cell access procedure.

At 245, the UE 115-b may avoid (e.g., not perform, not continue, or terminate) the cell access procedure for the target cell based at least in part on the identifier of the target cell identified at 240 being included (e.g., explicitly included, or otherwise mapped to, etc.) in the sub-optimal cell list. In some examples, the avoidance of the cell access procedure may be further based at least in part on a service associated with the cell access procedure of 235 not being included in a priority service exception list, or the sub-optimal cell list being associated with the identified SIM, or the sub-optimal cell list (or one or more identifiers in the sub-optimal cell list) being associated with the identified geographical region, or the PCI being associated with an active barring timer (e.g., a timer barring access to cells associated with the PCI for a period of time), and/or the sub-optimal cell list (or one or more identifiers in the sub-optimal cell list) being associated with the identified network operator.

At 250, and upon avoiding the cell access procedure at 245, the UE may initiate an access barring timer to bar access to cells associated with the PCI identified at 240. In some examples, access to cells associated with the PCI may be barred by causing the UE 115-b to skip a decode of master information block (MIB) and/or first system information block (SIB1) information upon identifying (e.g., from a primary synchronization signal (PSS) and/or a secondary synchronization signal (SSS) received during a cell search) a PCI associated with an active access barring timer. In some examples, access to cells associated with the PCI may additionally or alternatively be barred by causing the UE 115-b to reject a network-initiated cell redirection (e.g., a cell reselection) to a cell associated with the PCI. Access to cells associated with the PCI may be barred for a period of time that is long enough to prevent repeated MIB/SIB1 decodes or cell redirections for/to a sub-optimal cell while the UE 115-b remains in a particular geographical region, but not so long as to prevent the UE 115-b from decoding MIB/SIB1 information for a possibly useful cell in a different geographical location (which useful cell may be associated with the same PCI as the sub-optimal cell that triggered initiation of the access barring timer). In some examples, an access barring timer may have a duration on the order of five minutes.

In some examples of the communications procedure 200, the UE 115-b may alter measurements (e.g., reference signal received power (RSRP), reference signal receive quality (RSRQ), received signal code power (RSCP) measurements, etc.) reported to the network for a sub-optimal cell, to increase the likelihood that the network will avoid or give a low priority to handovers to the sub-optimal cell (e.g., a low priority compared to other neighbor cells).

Figure 3:
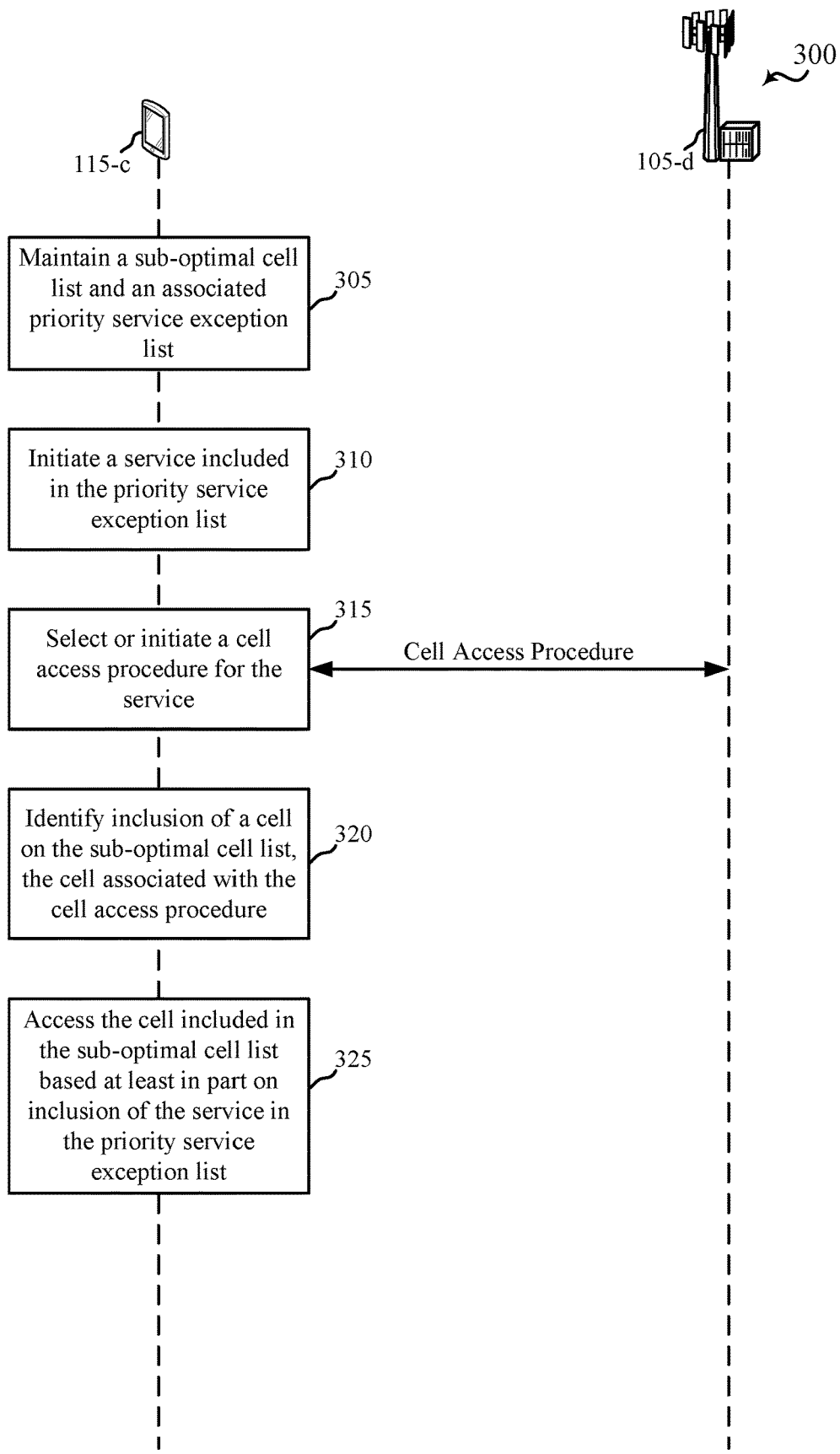
FIG. 3 shows a communications procedure in which one or more restrictions on avoiding sub-optimal cells are relaxed when a cell access procedure is initiated for a service on a priority service exception list, in accordance with one or more aspects of the present disclosure.

FIG. 3 shows a communications procedure 300 in which one or more restrictions on avoiding sub-optimal cells are relaxed when a cell access procedure is initiated for a service on a priority service exception list, in accordance with one or more aspects of the present disclosure. Messages of the communications procedure 300 may be transmitted between a base station 105-d and a UE 115-c. The base station 105-d may be an example of aspects of one or more of the base stations 105 described with reference to FIG. 1 or 2, and the UE 115-c may be an example of aspects of one or more of the UEs 115 described with reference to FIG. 1 or 2.

At 305, the UE 115-c may maintain a sub-optimal cell list and an associated priority service exception list. In some examples, the priority service exception list may include services such as an emergency call, a warning system broadcast, a call associated with a priority level satisfying a threshold, and/or the like.

At 310, the UE 115-c may initiate a service included in the priority service exception list, and at 315, the UE 115-c may select or initiate a cell access procedure for the service. The cell access procedure may be selected or initiated with respect to a target cell including the base station 105-d. In some examples, the cell access procedure may include an initial access procedure, a HPPLMN scan, a manual PLMN scan, a manual PLMN selection, a manual CSG selection, a network-initiated cell redirection, a UE-initiated cell redirection, a cell search, camping in an idle state, and/or the like.

At 320, the UE 115-c may identify inclusion of the target cell on the sub-optimal cell list. However, the UE 115-c may access the target cell (and the base station 105-d), at 325, based at least in part on inclusion of the initiated service in the priority service exception list. In some examples, accessing the cell may include camping on the cell in an idle state. In some examples, access to the target cell may be further based at least in part on not receiving system information from a network indicating access to the target cell is barred. For example, when the UE 115-c receives system information (e.g., a first system information block (SIB1)) indicating that access to the target cell is barred, then access to the target cell may be avoided (e.g., not performed, not continued, or terminated). In some examples, the UE 115-c may clear any access barring timers that are active (e.g., for the target cell upon accessing the target cell).

Despite the UE 115-c being able to access the target cell and place an emergency call (e.g., based at least in part on inclusion of the emergency call in the priority service exception list), the UE 115-c may be unable to receive public warning system (PWS) broadcasts (e.g., Commercial Mobile Alert System (CMAS) and/or Earthquake and Tsunami Warning System (ETWS) broadcasts) and/or Cell Broadcast Center (CBC) broadcasts, unless a service that enables the receipt of PWS or CBC broadcasts is initiated by the UE 115-c and included in the priority service exception list. In some examples, the UE 115-c may be enabled to periodically access a target cell that is included in the sub-optimal cell list but not the priority service exception list. In this manner, the UE 115-c may periodically camp on a sub-optimal cell and receive PWS broadcasts, CBC broadcasts, and/or other information from a sub-optimal cell (that is, assuming the sub-optimal cell has sufficient network connectivity to enable such information downloads to the UE 115-c).

Under some conditions, access to a target cell may be allowed when an identifier of the target cell is included in a sub-optimal cell list but is not included in a priority service exception list. For example, access to a target cell may be allowed based at least in part on the UE 115-c operating in a limited service mode. For example, when the UE 115-c is operating in a limited service mode (e.g., because a universal integrated circuit card (UICC) has been removed from the UE 115-c, or because a universal subscriber identity module (USIM) has been invalidated for circuit-switched (CS) services on the GSM/WCDMA/LTE access stratums), the UE 115-c may be allowed to access a target cell included in the sub-optimal cell list. As another example, access to a target cell may be allowed based at least in part on a USIM of the UE 115-c being invalidated for EPS services. As another example, access to a target cell may be allowed based at least in part on non-availability of an alternative cell. As another example, access to a target cell may be allowed based at least in part on the UE 115-c performing a cell search to enable a high priority service (e.g., an emergency call) post RLF. When accessing a target cell in a limited service mode, or when a USIM is invalidated for EPS services, or when an alternative cell is not available, or post RLF, the UE 115-c may clear any access barring timers that are active (e.g., for the target cell).

In some examples, the sub-optimal cell list or priority service exception list maintained by the UE 115-b or 115-c, described with reference to FIG. 2 or 3, may be maintained for a particular radio access technology (RAT), and an additional sub-optimal cell list or priority service exception list may be maintained for each of a number of additional RATs (or sets of RATs). In some examples, a sub-optimal cell list may be maintained for each of a 1× Evolution for Data Optimized (1×EV-DO) RAT, an Evolution for Data Optimized (DO) RAT, a Global System for Mobile Communication (GSM) RAT and/or GSM EDGE Radio Access Network (GERAN) RAT, a Universal Mobile Telecommunication System (UMTS) RAT and/or Time Division Synchronization (TDS) RAT, a LTE/LTE-A RAT, and/or a Wi-Fi RAT. In some examples, a sub-optimal cell list may associate an identifier of a sub-optimal cell (e.g., a Cell ID) with a public land mobile network identity (PLMN ID) and a RAT. In some examples (e.g., in the case of a Cell ID associated with a GERAN RAT), the Cell ID may also be associated with a Location Area Identity (LAI). In the case of a WLAN AP (considered a "cell" for purposes of this disclosure), the WLAN AP may be identified by a basic service set identity (BSSID), and the BSSID may be associated with a WLAN RAT (e.g., a Wi-Fi RAT) in a sub-optimal cell list.

In some examples, a sub-optimal cell list may be enabled for some network operators, but not other network operators. For example, a sub-optimal cell list may be associated with a network operator operating in a geographical region known (or expected) to include sub-optimal cells, or with certain mobile based network (MBN) identifiers or PLMN IDs.

In the case of a multiple SIM (MULTI-SIM) UE, a sub-optimal cell list may be associated with one or more of the multiple SIMs, and with one or more access stratums (e.g., LTE/TDD/WCDMA/GSM access stratums) or subscriptions. In the case of a Dual SIM Dual Standby (DSDM) UE, a sub-optimal cell list may be associated with one or more access stratums (e.g., GSM (e.g., for one or more of the SIMs)).

In some examples, the UE 115-b or UE 115-c described with reference to FIG. 2 or 3 may perform Connected Mode Measurements on the PCIs associated with cells included in a sub-optimal cell list, and may support Connected Mode Handovers to PCIs associated with sub-optimal cells.

Figure 4:
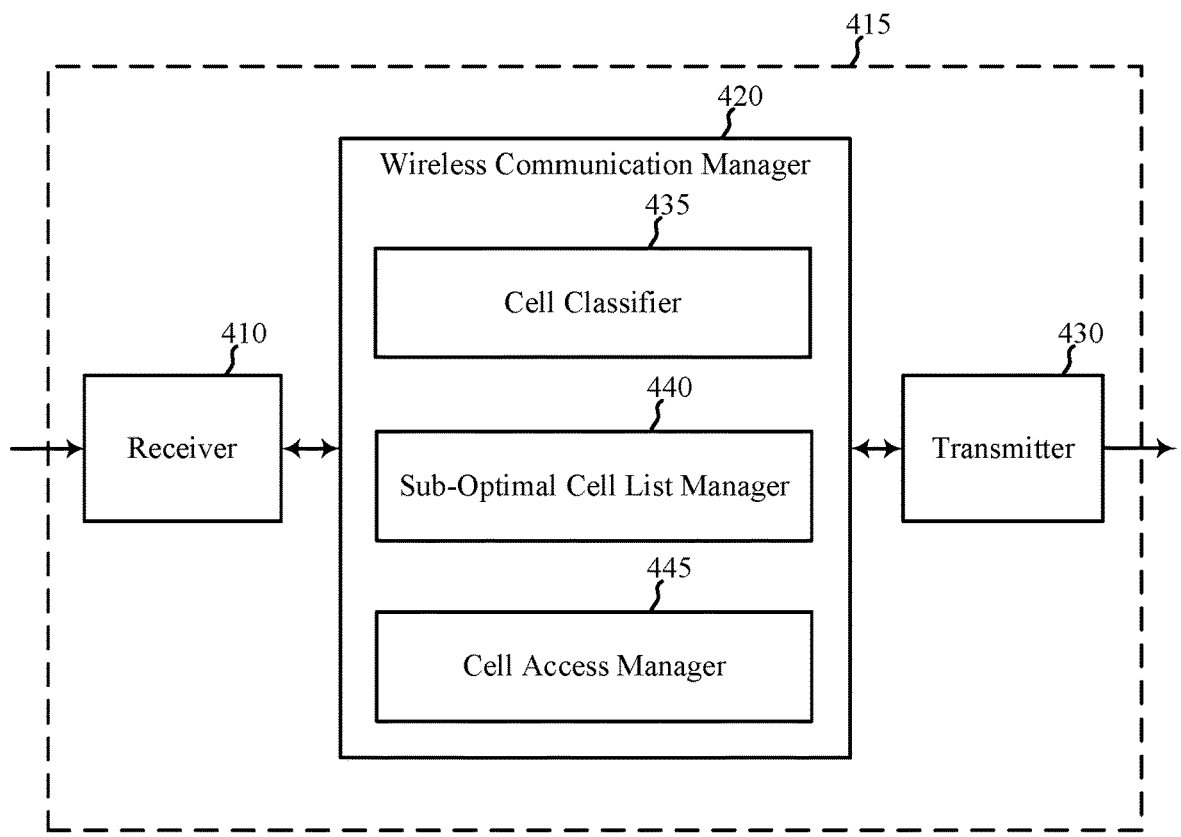
FIG. 4 shows a block diagram of a device that supports identifying, avoiding, and/or allowing limited access to sub-optimal cells for wireless communication, in accordance with one or more aspects of the present disclosure.

FIG. 4 shows a block diagram 400 of a device 415 that supports identifying, avoiding, and/or allowing limited access to sub-optimal cells for wireless communication, in accordance with one or more aspects of the present disclosure. The device 415 may be an example of aspects of one or more of the UEs 115 described with reference to FIG. 1, 2, or 3. The device 415 may be or include a processor. The device 415 may include a receiver 410, a wireless communication manager 420, and/or a transmitter 430. Each of these components may be in communication with each other.

The components of the device 415 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with one or more instructions embodied in a memory, formatted to be executed by one or more general or application-specific processors.

In some examples, the receiver 410 may include at least one RF receiver usable for LTE/LTE-A communications, as described, for example, with reference to FIG. 1, 2, or 3. The receiver 410 may be used to receive various types of data or control signals (e.g., transmissions) over one or more communication links of a wireless communication system, such as one or more communication links of the wireless communication system 100 described with reference to FIG. 1.

In some examples, the transmitter 430 may include at least one RF transmitter usable for LTE/LTE-A communications. The transmitter 430 may be used to transmit various types of data or control signals (e.g., transmissions) over one or more communication links of a wireless communication system, such as one or more communication links of the wireless communication system 100 described with reference to FIG. 1.

In some examples, the wireless communication manager 420 may be used to manage one or more aspects of wireless communication for the device 415. In some examples, part of the wireless communication manager 420 may be incorporated into or shared with the receiver 410 and/or the transmitter 430. In some examples, the wireless communication manager 420 may include a cell classifier 435, a sub-optimal cell list manager 440, and/or a cell access manager 445.

The cell classifier 435 may be used to classify a cell with which the device 415 may communicate as sub-optimal, as described herein. The classification may be based at least in part on determining that a service, service level, and/or capability is not supported at the cell; statistical information collected at the UE over time; crowd-sourced information received by the UE; a performance metric determined by the UE; and/or a speed test performed by the UE.

The sub-optimal cell list manager 440 may be used to update a sub-optimal cell list with an identifier of a cell (e.g., add the identifier of the cell to the sub-optimal cell list), based at least in part on the cell classifier 435 classifying the cell as sub-optimal, as described herein.

The cell access manager 445 may be used to avoid a cell access procedure for a cell based at least in part on inclusion of an identifier of the cell in the sub-optimal cell list, as described herein. In some examples, the cell access procedure may include an initial access procedure, a HPPLMN scan, a manual PLMN scan, a manual PLMN selection, a manual CSG selection, a network-initiated cell redirection, a UE-initiated cell redirection, a cell search, camping in an idle state, and/or the like.

Figure 5:
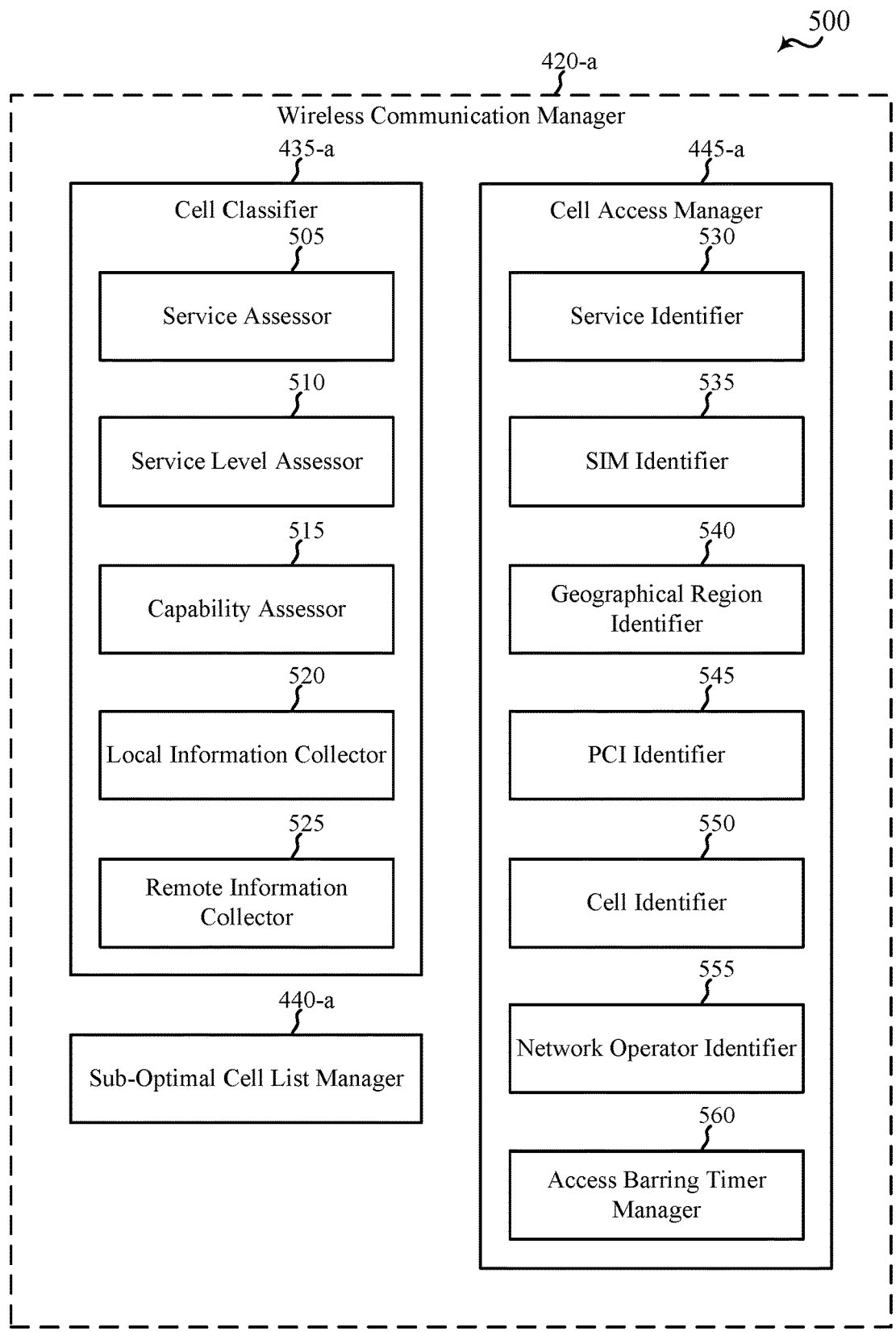
FIG. 5 shows a block diagram of a wireless communication manager that supports identifying, avoiding, and/or allowing limited access to sub-optimal cells for wireless communication, in accordance with one or more aspects of the present disclosure.

FIG. 5 shows a block diagram 500 of a wireless communication manager 420-*a* that supports identifying, avoiding, and/or allowing limited access to sub-optimal cells for wireless communication, in accordance with one or more aspects of the present disclosure. The wireless communication manager 420-*a* may be an example of, or an alternative to the wireless communication manager 420 described with reference to FIG. 4, or may be provided in one or more of the UEs 115 described with reference to FIG. 1, 2, or 3. The wireless communication manager 420-*a* may be used to manage one or more aspects of wireless communication for a device or UE. In some examples, part of the wireless communication manager 420-*a* may be incorporated into or shared with a receiver and/or a transmitter of a device, such as the receiver 410 or the transmitter 430 of the device 415 described with reference to FIG. 4. In some examples, the wireless communication manager 420-*a* may include a cell classifier 435-*a*, a sub-optimal cell list manager 440-*a*, and/or a cell access manager 445-*a*, which may be examples of the respective components described with reference to FIG. 4.

The components of the wireless communication manager 420-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with one or more instructions embodied in a memory, formatted to be executed by one or more general or application-specific processors.

The cell classifier 435-*a* may include a service assessor 505, a service level assessor 510, a capability assessor 515, a local information collector 520, and/or a remote information collector 525. The service assessor 505 may be used to determine whether a service is supported at a cell, as described herein. The service level assessor 510 may be used to determine whether a service level is supported at a cell, as described herein. In some examples, a service level may be determined to not be supported at a cell based at least in part on determining a throughput or reliability associated with the cell fails to satisfy a first threshold, determining that a RLF rate associated with the cell satisfies a second threshold, determining that an audio delay and/or audio jitter associated with the cell satisfies a third threshold, and/or determining that a real-time service delay and/or jitter associated with the cell satisfies a fourth threshold.

The capability assessor 515 may be used to determine whether a capability is supported at a cell, as described herein. In some examples, a capability may be determined to not be supported at a cell based at least in part on determining a MIMO capability is not supported at the cell and/or determining a CA capability is not supported at the cell. The local information collector 520 may be used to collect statistical information for one or more cells over time, determine a performance metric for one or more cells, and/or probe one or more cells (e.g., perform a speed test for one or more cells), as described herein. The remote information collector 525 may be used to receive crowd-sourced information for one or more cells.

In some examples, the cell classifier 435-*a* may be used to classify a cell with which a device including the wireless communication manager 420-*a* communicates as sub-optimal. In some examples, the classification may be based at least in part on determining that a service, service level, and/or capability is not supported at the cell. In some examples, the cell classifier 435-*a* may additionally or alternatively classify the cell as sub-optimal based at least in part on statistical information collected for the cell (and/or other cells) over time; crowd-sourced information received for the cell (and/or other cells); a performance metric determined for the cell (and/or other cells); and/or a speed test performed by the cell (and/or other cells).

The sub-optimal cell list manager 440-*a* may be used to update a sub-optimal cell list with an identifier of a cell (e.g., add the identifier of the cell to the sub-optimal cell list), based at least in part on the cell classifier 435-*a* classifying the cell as sub-optimal.

The cell access manager 445-*a* may include a service identifier 530, a SIM identifier 535, a geographical region identifier 540, a PCI identifier 545, a cell identifier 550, a network operator identifier 555, and/or an access barring timer manager 560. The service identifier 530 may be used to optionally identify a service associated with a cell access procedure, as described herein. In some examples, the cell access procedure may include an initial access procedure, a HPPLMN scan, a manual PLMN scan, a manual PLMN selection, a manual CSG selection, a network-initiated cell redirection, a UE-initiated cell redirection, a cell search, camping in an idle state, and/or the like. The SIM identifier 535 may be used to identify a SIM associated with a cell access procedure, as described herein. The geographical region identifier 540 may be used to identify a geographical region associated with a cell access procedure, as described herein. The PCI identifier 545 may be used to identify a PCI associated with a target cell of a cell access procedure, as described herein. The cell identifier 550 may be used to identify a target cell associated with a cell access procedure (e.g., by identifying a Cell ID or other identifier of the target cell), as described herein. The network operator identifier 555 may be used to identify a network operator associated with the target cell, as described herein. The access barring timer manager 560 may be used to bar access to cells for a period of time, as described herein.

In some examples, the cell access manager 445-*a* may be used to determine whether to perform or continue a cell access procedure for a target cell. The cell access manager 445-*a* may determine to avoid (e.g., not perform, not continue, or terminate) the cell access procedure for the target cell based at least in part on inclusion of an identifier of the target cell in a sub-optimal cell list. In some examples, the avoidance of the cell access procedure may be further based at least in part on a service associated with the cell access procedure not being included in a priority service exception list, or a sub-optimal cell list being associated with an identified SIM, or a sub-optimal cell list (or one or more identifiers in the sub-optimal cell list) being associated with an identified geographical region, or a PCI being associated with an active barring timer (e.g., a timer barring access to cells associated with the PCI for a period of time), and/or a sub-optimal cell list (or one or more identifiers in the sub-optimal cell list) being associated with an identified network operator.

The cell access manager 445-*a* may determine to perform or continue the cell access procedure for the target cell based at least in part on determining that the sub-optimal cell list does not include an identifier of the target cell, or that the priority service exception list includes the identifier of the cell. In some examples, performance or continuance of the cell access procedure may be further based at least in part on not receiving system information from a network indicating access to the target cell is barred, a UE including the wireless communication manager 420-*a* operating in a limited service mode, a USIM of the UE being invalidated for EPS services, and/or non-availability of an alternative cell. In some examples, accessing the target cell may include camping on the target cell in an idle state.

Upon the cell access manager 445-*a* avoiding a cell access procedure for a target cell, where the target cell is associated with a cell access procedure, the access barring timer manager 560 may initiate a timer to bar access to cells associated with a PCI corresponding to the target cell. Access to cells associated with the PCI may be barred for a period of time (e.g., five minutes).

Figure 6:
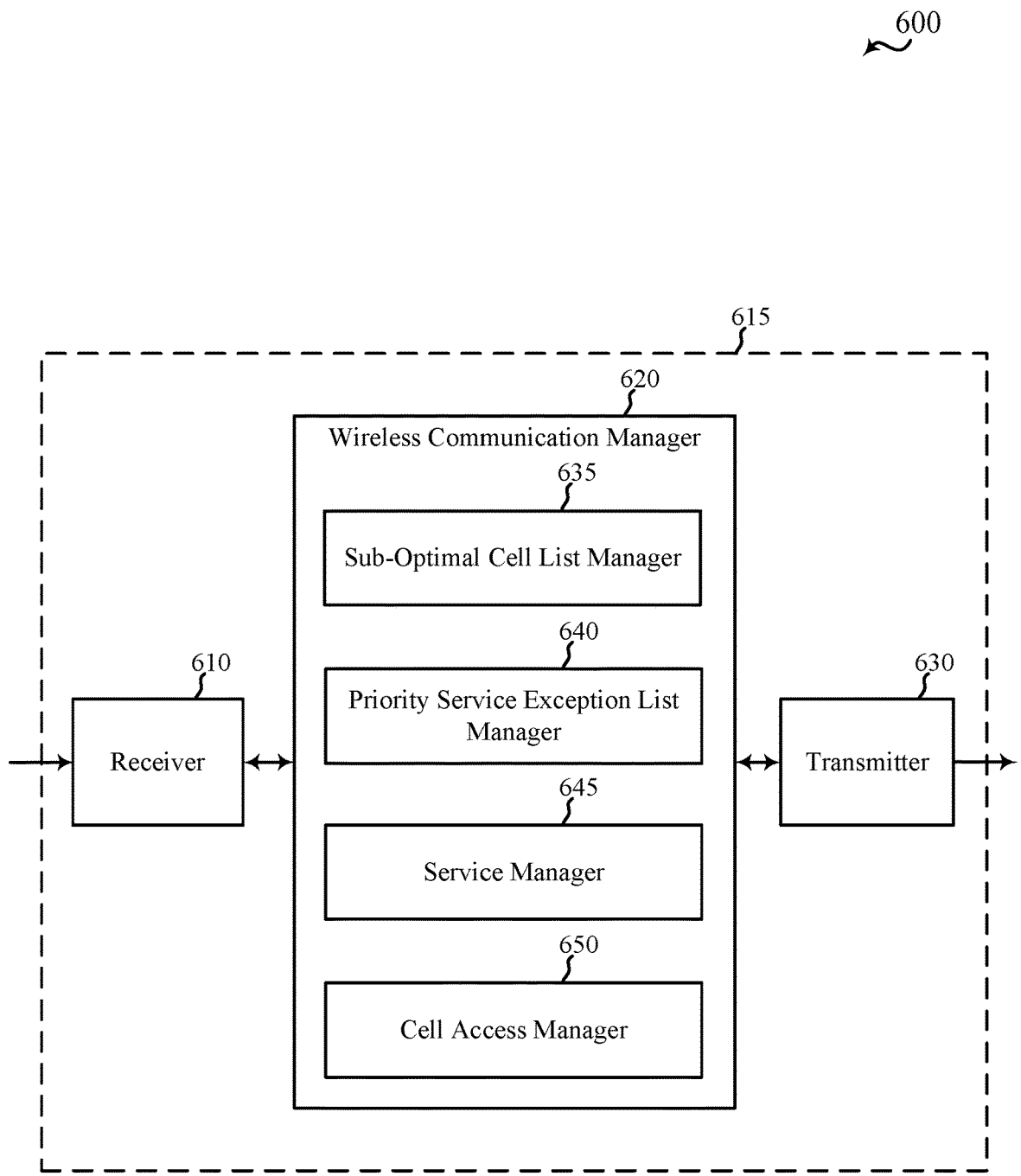
FIG. 6 shows a block diagram of a device that supports identifying, avoiding, and/or allowing limited access to sub-optimal cells for wireless communication, in accordance with one or more aspects of the present disclosure.

FIG. 6 shows a block diagram 600 of a device 615 that supports identifying, avoiding, and/or allowing limited access to sub-optimal cells for wireless communication, in accordance with one or more aspects of the present disclosure. The device 615 may be an example of aspects of one or more of the UEs 115 described with reference to FIG. 1, 2, or 3. The device 615 may be or include a processor. The device 615 may include a receiver 610, a wireless communication manager 620, and/or a transmitter 630. Each of these components may be in communication with each other.

The components of the device 615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with one or more instructions embodied in a memory, formatted to be executed by one or more general or application-specific processors.

In some examples, the receiver 610 may include at least one RF receiver usable for LTE/LTE-A communications, as described, for example, with reference to FIG. 1, 2, or 3. The receiver 610 may be used to receive various types of data or control signals (e.g., transmissions) over one or more communication links of a wireless communication system, such as one or more communication links of the wireless communication system 100 described with reference to FIG. 1.

In some examples, the transmitter 630 may include at least one RF transmitter usable for LTE/LTE-A communications. The transmitter 630 may be used to transmit various types of data or control signals (e.g., transmissions) over one or more communication links of a wireless communication system, such as one or more communication links of the wireless communication system 100 described with reference to FIG. 1.

In some examples, the wireless communication manager 620 may be used to manage one or more aspects of wireless communication for the device 615. In some examples, part of the wireless communication manager 620 may be incorporated into or shared with the receiver 610 and/or the transmitter 630. In some examples, the wireless communication manager 620 may include a sub-optimal cell list manager 635, a priority service exception list manager 640, a service manager 645, and/or a cell access manager 650.

The sub-optimal cell list manager 635 may be used to maintain a sub-optimal cell list, and the priority service exception list manager 640 may be used to maintain a priority service exception list associated with the sub-optimal cell list, as described herein. In some examples, the priority service exception list may include services such as an emergency call, a warning system broadcast, a call associated with a priority level satisfying a threshold, and/or the like.

The service manager 645 may be used to initiate a service, as described herein. In some cases, the service may be included in the priority service exception list.

The cell access manager 650 may be used to identify inclusion of a cell on the sub-optimal cell list, as described herein. The cell may be associated with a cell access procedure initiated for a service initiated by the service manager 645. In some examples, the cell access manager 650 may access the cell included on the sub-optimal cell list based at least in part on inclusion of the service in the priority service exception list. In some examples, accessing the cell may be further based at least in part on non-receipt of system information from a network indicating access to the cell is barred, the UE operating in a limited service mode, a USIM of the UE being invalidated for EPS services, and/or non-availability of an alternative cell. In some examples, accessing the cell may include camping on the cell in an idle state.

Figure 7:
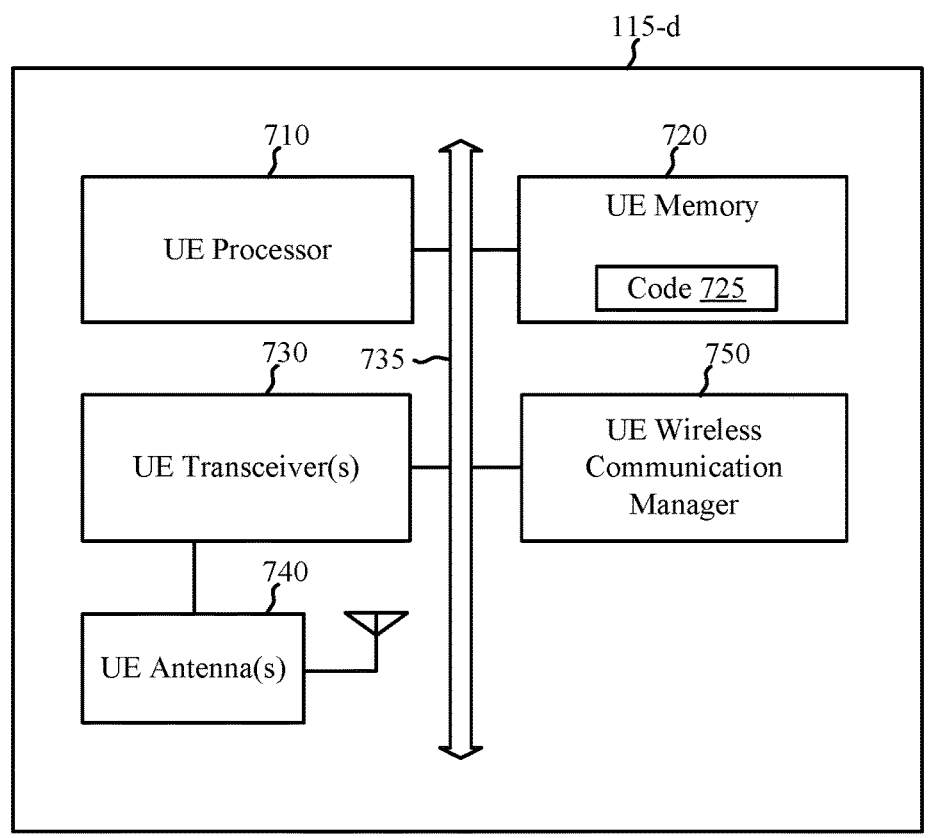
FIG. 7 shows a block diagram of a UE that supports identifying, avoiding, and/or allowing limited access to sub-optimal cells for wireless communication, in accordance with one or more aspects of the present disclosure.

FIG. 7 shows a block diagram 700 of a UE 115-*d* that supports identifying, avoiding, and/or allowing limited access to sub-optimal cells for wireless communication, in accordance with one or more aspects of the present disclosure. The UE 115-*d* may be or be part of a personal computer (e.g., a laptop computer, a netbook computer, a tablet computer, etc.), a cellular telephone, a PDA, a DVR, an internet appliance, a gaming console, an e-reader, etc. The UE 115-*d* may, in some examples, have an internal power supply (not shown), such as a battery, to facilitate mobile operation. In some examples, the UE 115-*d* may be an example of aspects of one or more of the UEs 115 described with reference to FIG. 1, 2, or 3, or aspects of one or more of the devices 415 or 615 described with reference to FIG. 4 or 6. The UE 115-*d* may be configured to implement at least some of the UE or apparatus techniques and functions described with reference to FIG. 1, 2, 3, 4, 5, or 6.

The UE 115-*d* may include a UE processor 710, a UE memory 720, at least one UE transceiver (represented by UE transceiver(s) 730), at least one UE antenna (represented by UE antenna(s) 740), and/or a UE wireless communication manager 750. Each of these components may be in communication with each other, directly or indirectly, over one or more buses 735.

The UE memory 720 may include random access memory (RAM) and/or read-only memory (ROM). The UE memory 720 may store computer-readable, computer-executable code 725 including one or more instructions that are configured to, when executed by the UE processor 710, cause the UE 115-*d* to perform various functions described herein related to wireless communication, including, for example, identifying and avoiding sub-optimal cells, and relaxing one or more restrictions on avoiding sub-optimal cells when a cell access procedure is initiated for a service on a priority service exception list. Alternatively, the computer-executable code 725 may not be directly executable by the UE processor 710 but be configured to cause the UE 115-d (e.g., when compiled and executed) to perform various of the functions described herein.

The UE processor 710 may include an intelligent hardware device (e.g., a central processing unit (CPU), a microcontroller, an ASIC, etc.). The UE processor 710 may process information received through the UE transceiver(s) 730 or information to be sent to the UE transceiver(s) 730 for transmission through the UE antenna(s) 740. The UE processor 710 may handle, alone or in connection with the UE wireless communication manager 750, various aspects of communicating over (or managing communications over) one or more radio frequency spectrum bands.

The UE transceiver(s) 730 may include a modem configured to modulate packets and provide the modulated packets to the UE antenna(s) 740 for transmission, and to demodulate packets received from the UE antenna(s) 740. The UE transceiver(s) 730 may, in some examples, be implemented as one or more UE transmitters and one or more separate UE receivers. The UE transceiver(s) 730 may be configured to communicate bi-directionally, via the UE antenna(s) 740, with one or more base stations or apparatuses, such as one or more of the base stations 105 described with reference to FIG. 1, 2, or 3. While the UE 115-d may include a single UE antenna, there may be examples in which the UE 115-d may include multiple UE antennas 740.

The UE wireless communication manager 750 may be configured to perform or control some or all of the UE or apparatus techniques or functions described with reference to FIG. 1, 2, 3, 4, 5, or 6 related to wireless communication by a UE. The UE wireless communication manager 750, or portions of it, may include a processor, or some or all of the functions of the UE wireless communication manager 750 may be performed by the UE processor 710 or in connection with the UE processor 710. In some examples, the UE wireless communication manager 750 may be an example of one or more aspects of the wireless communication managers 420 or 620 described with reference to FIG. 4, 5, or 6.

Figure 8:
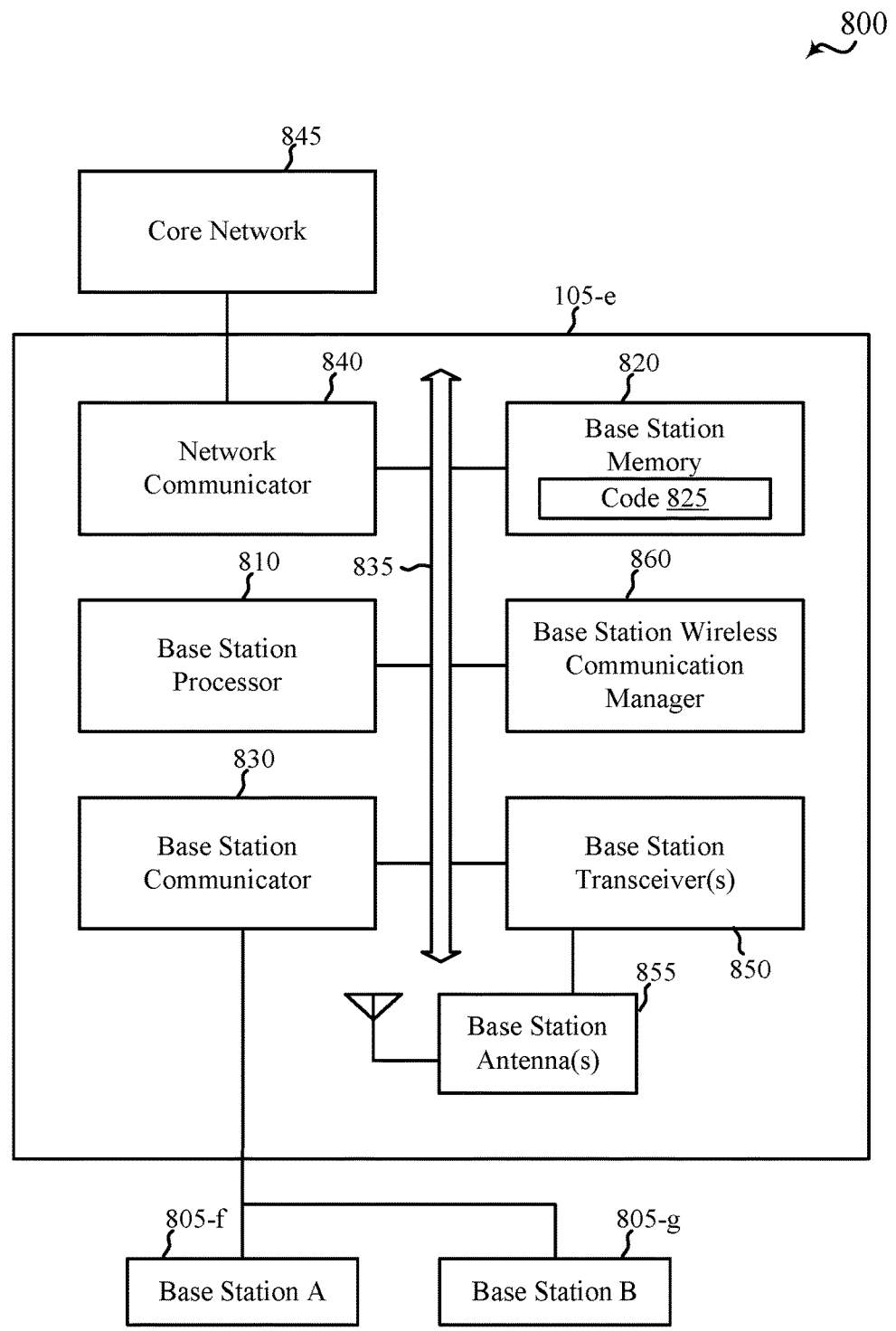
FIG. 8 shows a block diagram of a base station that supports identifying, avoiding, and/or allowing limited access to sub-optimal cells for wireless communication, in accordance with one or more aspects of the present disclosure.

FIG. 8 shows a block diagram 800 of a base station 105-e (e.g., a base station forming part or all of an eNB) that supports identifying, avoiding, and/or allowing limited access to sub-optimal cells for wireless communication, in accordance with one or more aspects of the present disclosure. In some examples, the base station 105-e may be an example of aspects of one or more of the base stations 105 described with reference to FIG. 1, 2, or 3. The base station 105-e may be configured to implement or facilitate at least some of the base station techniques and functions described with reference to FIG. 1, 2, or 3.

The base station 105-e may include a base station processor 810, a base station memory 820, at least one base station transceiver (represented by base station transceiver(s) 850), at least one base station antenna (represented by base station antenna(s) 855), and/or a base station wireless communication manager 860. The base station 105-e may also include one or more of a base station communicator 830 and/or a network communicator 840. Each of these components may be in communication with each other, directly or indirectly, over one or more buses 835.

The base station memory 820 may include RAM and/or ROM. The base station memory 820 may store computer-readable, computer-executable code 825 including one or more instructions that are configured to, when executed by the base station processor 810, cause the base station 105-e to perform various functions described herein related to wireless communication, including, for example, providing UEs information pertaining to a cell associated with the base station 105-e and/or information pertaining to other cells, which information may be used by one or more UEs to allow or bar access to the cell associated with the base station 105-e and/or the other cells. Alternatively, the computer-executable code 825 may not be directly executable by the base station processor 810 but be configured to cause the base station 105-e (e.g., when compiled and executed) to perform various of the functions described herein.

The base station processor 810 may include an intelligent hardware device (e.g., a CPU, a microcontroller, an ASIC, etc.). The base station processor 810 may process information received through the base station transceiver(s) 850, the base station communicator 830, or the network communicator 840. The base station processor 810 may process information to be sent to the transceiver(s) 850 for transmission through the antenna(s) 855, to the base station communicator 830, for transmission to one or more other base stations (e.g., base station 105-f and base station 105-g), or to the network communicator 840 for transmission to a core network 845, which may be an example of one or more aspects of the core network 130 described with reference to FIG. 1. The base station processor 810 may handle, alone or in connection with the base station wireless communication manager 860, various aspects of communicating over (or managing communications over) one or more radio frequency spectrum bands.

The base station transceiver(s) 850 may include a modem configured to modulate packets and provide the modulated packets to the base station antenna(s) 855 for transmission, and to demodulate packets received from the base station antenna(s) 855. The base station transceiver(s) 850 may, in some examples, be implemented as one or more base station transmitters and one or more separate base station receivers. The base station transceiver(s) 850 may be configured to communicate bi-directionally, via the antenna(s) 855, with one or more UEs or apparatuses, such as one or more of the UEs 115 described with reference to FIG. 1, 2, 3, or 7, or one or more of the devices 415 or 615 described with reference to FIG. 4 or 6. The base station 105-e may, for example, include multiple base station antennas 855 (e.g., an antenna array). The base station 105-e may communicate with the core network 845 through the network communicator 840. The base station 105-e may also communicate with other base stations, such as the base station 105-f and the base station 105-g, using the base station communicator 830.

The base station wireless communication manager 860 may be configured to perform or control some or all of the techniques or functions described with reference to FIG. 1, 2, or 3 related to wireless communication by a base station. The base station wireless communication manager 860, or portions of it, may include a processor, or some or all of the functions of the base station wireless communication manager 860 may be performed by the base station processor 810 or in connection with the base station processor 810.

Figure 9:
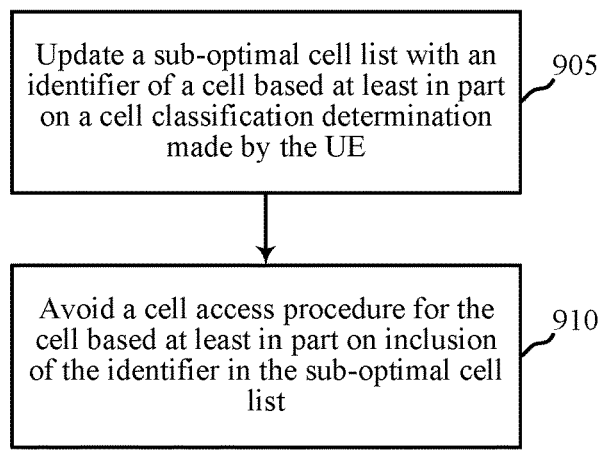
FIGS. 9-11 are flow charts illustrating examples of methods that support identifying, avoiding, and/or allowing limited access to sub-optimal cells for wireless communication at a UE, in accordance with one or more aspects of the present disclosure.

FIG. 9 is a flow chart illustrating an example of a method 900 that supports identifying and avoiding access to sub-optimal cells for wireless communication at a UE, in accordance with one or more aspects of the present disclosure. For clarity, the method 900 described below with reference to aspects of the UE 115 described with reference to FIG. 1, 2, 3, or 7, or aspects of the device 415 or 615 described with reference to FIG. 4 or 6. In some examples, a UE 115 may execute one or more sets of codes to control the functional elements of the UE 115 to perform the functions described below. Additionally or alternatively, the UE 115 may perform one or more of the functions described below using special-purpose hardware.

At block 905, the UE may update a sub-optimal cell list with an identifier of a cell (e.g., add the identifier of the cell to the sub-optimal cell list) based at least in part on a cell classification determination made by the UE, as described herein. Operation(s) at block 905 may be performed using the wireless communication manager 420 or 620, or UE wireless communication manager 750, described with reference to FIG. 4, 6, or 7, or the cell classifier 435 or sub-optimal cell list manager 440 described with reference to FIG. 4 or 5.

At block 910, the UE may avoid a cell access procedure for the cell based at least in part on inclusion of the identifier in the sub-optimal cell list, as described herein. Operation(s) at block 910 may be performed using the wireless communication manager 420 or 620, or UE wireless communication manager 750, described with reference to FIG. 4, 6, or 7, or the cell access manager 445 described with reference to FIG. 4 or 5.

Figure 10:
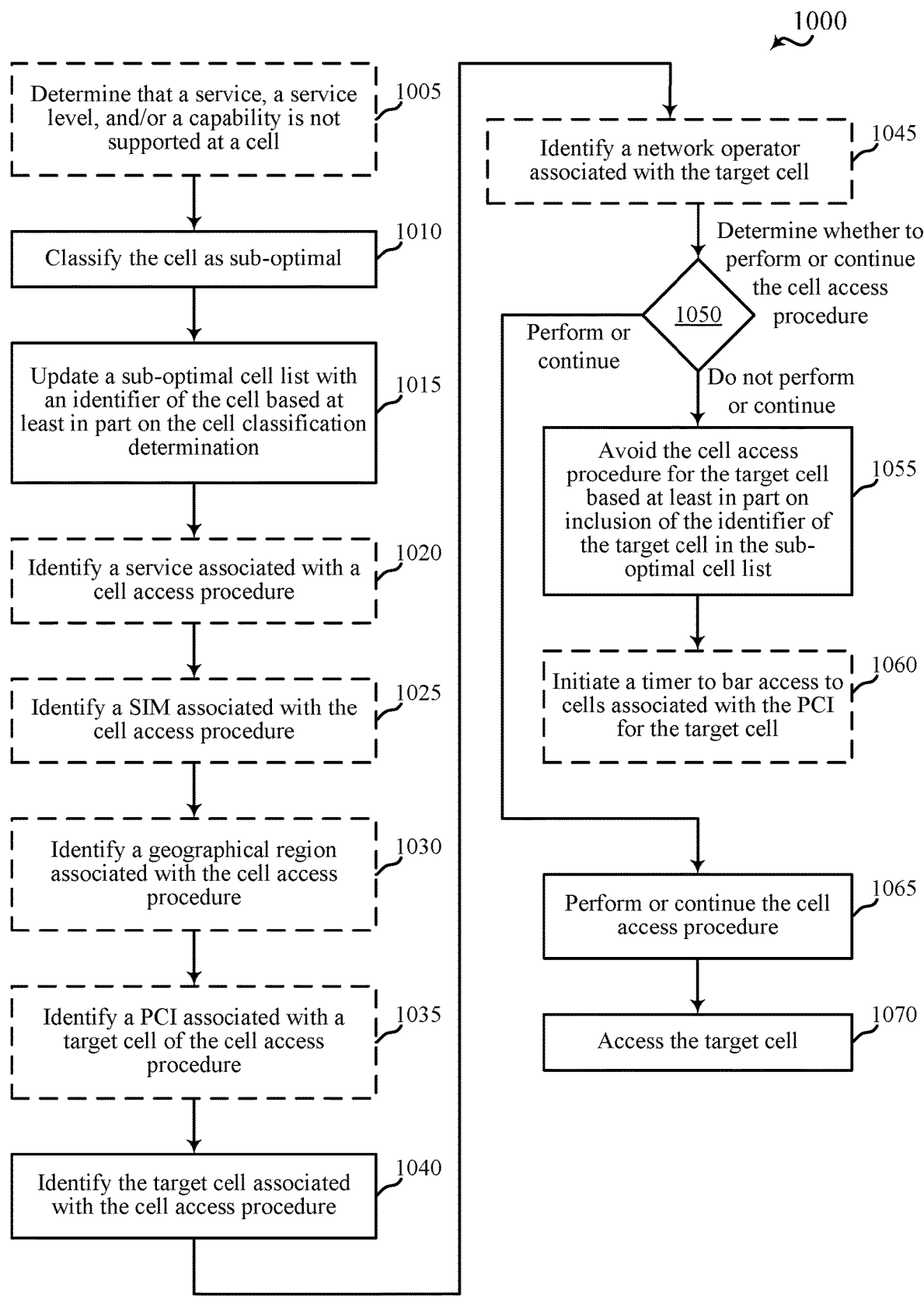

FIG. 10 is a flow chart illustrating another example of a method 1000 that supports identifying, avoiding, and/or allowing limited access to sub-optimal cells for wireless communication at a UE, in accordance with one or more aspects of the present disclosure. For clarity, the method 1000 is described below with reference to aspects of the UE 115 described with reference to FIG. 1, 2, 3, or 7, or aspects of the device 415 or 615 described with reference to FIG. 4 or 6. In some examples, a UE 115 may execute one or more sets of codes to control the functional elements of the UE 115 to perform the functions described below. Additionally or alternatively, the UE 115 may perform one or more of the functions described below using special-purpose hardware.

At block 1005, the UE may optionally determine that a service, a service level, and/or a capability is not supported at a cell, as described herein. In some examples, determining that a service level is not supported at the cell may include determining that a throughput or reliability associated with the cell fails to satisfy a first threshold, determining that a RLF rate associated with the cell satisfies a second threshold, determining that an audio delay and/or audio jitter associated with the cell satisfies a third threshold, and/or determining that a real-time service delay and/or jitter associated with the cell satisfies a fourth threshold. In some examples, determining that a capability is not supported at the cell may include determining that a MIMO capability is not supported at the cell and/or determining that a CA capability is not supported at the cell. Operation(s) at block 1005 may be performed using the wireless communication manager 420 or 620, or UE wireless communication manager 750, described with reference to FIG. 4, 6, or 7, the cell classifier 435 described with reference to FIG. 4 or 5, or the service assessor 505, service level assessor 510, and/or capability assessor 515 described with reference to FIG. 5.

At block 1010, the UE may classify the cell as sub-optimal, as described herein. The classification may be based at least in part on the determination made at block 1005. Additionally or alternatively, the classification may be based at least in part on statistical information collected for one or more cells at the UE over time, crowd-sourced information received for one or more cells at the UE, a performance metric determined for one or more cells by the UE, and/or a speed test performed for one or more cells by the UE. Operation(s) at block 1010 may be performed using the wireless communication manager 420 or 620 or UE wireless communication manager 750 described with reference to FIG. 4, 6, or 7, the cell classifier 435 described with reference to FIG. 4 or 5, or the local information collector 520 and/or remote information collector 525 described with reference to FIG. 5.

At block 1015, the UE may update a sub-optimal cell list with the identifier of the cell (e.g., add the identifier of the cell to the sub-optimal cell list) based at least in part on the cell classification determination made at block 1010, as described herein. Operation(s) at block 1015 may be performed using the wireless communication manager 420 or 620, or UE wireless communication manager 750, described with reference to FIG. 4, 6, or 7, or the sub-optimal cell list manager 440 described with reference to FIG. 4 or 5.

At block 1020, the UE may optionally identify a service associated with a cell access procedure, as described herein. In some examples, the cell access procedure may include an initial access procedure, a HPPLMN scan, a manual PLMN scan, a manual PLMN selection, a manual CSG selection, a network-initiated cell redirection, a UE-initiated cell redirection, a cell search, camping in an idle state, and/or the like. Operation(s) at block 1020 may be performed using the wireless communication manager 420 or 620, or UE wireless communication manager 750, described with reference to FIG. 4, 6, or 7, the cell access manager 445 described with reference to FIG. 4 or 5, or the service identifier 530 described with reference to FIG. 5.

At block 1025, the UE may optionally identify a SIM associated with the cell access procedure, as described herein. Operation(s) at block 1025 may be performed using the wireless communication manager 420 or 620, or UE wireless communication manager 750, described with reference to FIG. 4, 6, or 7, or the SIM identifier 535 described with reference to FIG. 5.

At block 1030, the UE may optionally identify a geographical region associated with the cell access procedure, as described herein. Operation(s) at block 1030 may be performed using the wireless communication manager 420 or 620, or UE wireless communication manager 750, described with reference to FIG. 4, 6, or 7, the cell access manager 445 described with reference to FIG. 4 or 5, or the geographical region identifier 540 described with reference to FIG. 5.

At block 1035, the UE may optionally identify a PCI associated with a target cell of the cell access procedure, as described herein. Operation(s) at block 1035 may be performed using the wireless communication manager 420 or 620, or UE wireless communication manager 750, described with reference to FIG. 4, 6, or 7, the cell access manager 445 described with reference to FIG. 4 or 5, or the PCI identifier 545 described with reference to FIG. 5.

At block 1040, the UE may identify the target cell associated with the cell access procedure (e.g., by identifying a Cell ID or other identifier of the target cell), as described herein. Operation(s) at block 1040 may be performed using the wireless communication manager 420 or 620, or UE wireless communication manager 750, described with reference to FIG. 4, 6, or 7, the cell access manager 445 described with reference to FIG. 4 or 5, or the cell identifier 550 described with reference to FIG. 5.

At block 1045, the UE may optionally identify a network operator associated with the target cell, as described herein. Operation(s) at block 1045 may be performed using the wireless communication manager 420 or 620, or UE wireless communication manager 750, described with reference to FIG. 4, 6, or 7, the cell access manager 445 described with reference to FIG. 4 or 5, or the network operator identifier 555 described with reference to FIG. 5.

At block 1050, the UE may determine whether to perform or continue the cell access procedure for the target cell, as described herein. Upon determining to perform or continue the cell access procedure, the method 1000 may continue at block 1055. Upon determining not to perform or continue the cell access procedure (e.g., terminate the cell access procedure), the method 1000 may continue at block 1065. Operation(s) at block 1050 may be performed using the wireless communication manager 420 or 620, or UE wireless communication manager 750, described with reference to FIG. 4, 6, or 7, or the cell access manager 445 described with reference to FIG. 4 or 5.

At block 1055, the UE may avoid (e.g., not perform, not continue, or terminate) the cell access procedure for the target cell based at least in part on inclusion of the identifier of the target cell in the sub-optimal cell list, as described herein. In some examples, the avoidance of the cell access procedure may be further based at least in part on the service associated with the cell access procedure not being included in a priority service exception list, or the sub-optimal cell list being associated with the identified SIM, or the sub-optimal cell list (or one or more identifiers in the sub-optimal cell list) being associated with the identified geographical region, or the PCI being associated with an active barring timer (e.g., a timer barring access to cells associated with the PCI for a period of time), and/or the sub-optimal cell list (or one or more identifiers in the sub-optimal cell list) being associated with the identified network operator. Operation(s) at block 1055 may be performed using the wireless communication manager 420 or 620, or UE wireless communication manager 750, described with reference to FIG. 4, 6, or 7, or the cell access manager 445 described with reference to FIG. 4 or 5.

At block 1060, and upon avoiding the cell access procedure, the UE may optionally initiate a timer to bar access to cells associated with the PCI for the target cell, as described herein. Access to cells associated with the PCI may be barred for a period of time (e.g., five minutes). Operation(s) at block 1060 may be performed using the wireless communication manager 420 or 620, or UE wireless communication manager 750, described with reference to FIG. 4, 6, or 7, the cell access manager 445 described with reference to FIG. 4 or 5, or the access barring timer manager 560 described with reference to FIG. 5.

At block 1065, the UE may perform or continue the cell access procedure for the target cell, as described herein. The cell access procedure may be performed or continued based at least in part on determining, at block 1050, that the sub-optimal cell list does not include the identifier of the target cell, or that the priority service exception list includes the identifier of the cell. In some examples, performance or continuance of the cell access procedure may be further based at least in part on not receiving system information from a network indicating access to the target cell is barred, the UE operating in a limited service mode, a USIM of the UE being invalidated for EPS services, and/or non-availability of an alternative cell. Operation(s) at block 1065 may be performed using the wireless communication manager 420 or 620, or UE wireless communication manager 750, described with reference to FIG. 4, 6, or 7, or the cell access manager 445 described with reference to FIG. 4 or 5.

At block 1070, the UE may access the target cell, as described herein. In some examples, accessing the target cell may include camping on the target cell in an idle state. The operation(s) at block 1070 may be performed using the wireless communication manager 420 or 620, or UE wireless communication manager 750, described with reference to FIG. 4, 6, or 7, or the cell access manager 445 described with reference to FIG. 4 or 5. In aspects, accessing may include initiating access and/or successfully accessing.

Figure 11:
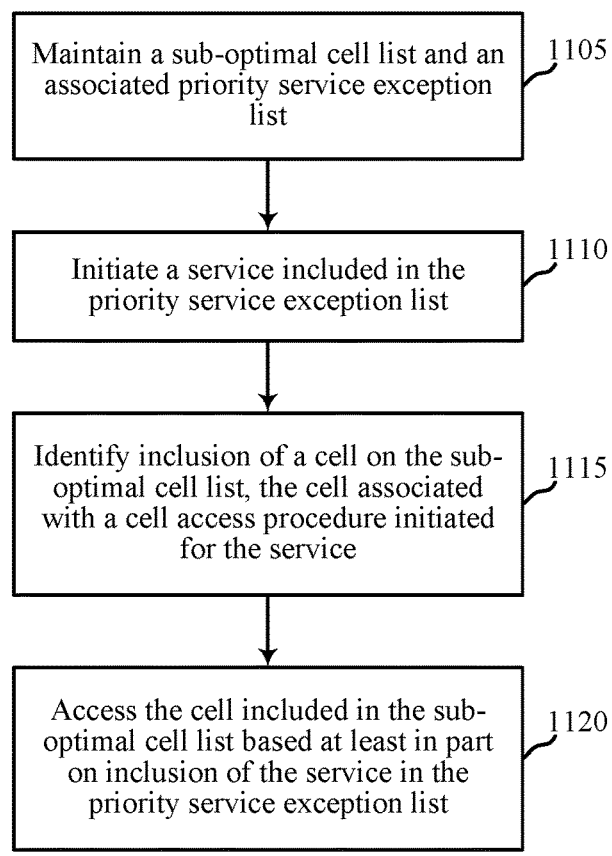

FIG. 11 is a flow chart illustrating another example of a method 1100 that supports identifying and/or allowing limited access to sub-optimal cells for wireless communication at a UE, in accordance with one or more aspects of the present disclosure. For clarity, the method 1100 described below with reference to aspects of the UE 115 described with reference to FIG. 1, 2, 3, or 7, or aspects of the device 415 or 615 described with reference to FIG. 4 or 6. In some examples, a UE 115 may execute one or more sets of codes to control the functional elements of the UE 115 to perform the functions described below. Additionally or alternatively, the UE 115 may perform one or more of the functions described below using special-purpose hardware.

At block 1105, the UE may maintain a sub-optimal cell list and an associated priority service exception list, as described herein. In some examples, the priority service exception list may include services such as an emergency call, a warning system broadcast, a call associated with a priority level satisfying a threshold, and/or the like. Operation(s) at block 1105 may be performed using the wireless communication manager 420 or 620, or UE wireless communication manager 750, described with reference to FIG. 4, 6, or 7, or the sub-optimal cell list manager 635 or priority service exception list manager 640 described with reference to FIG. 6.

At block 1110, the UE may initiate a service included in the priority service exception list, as described herein. Operation(s) at block 1110 may be performed using the wireless communication manager 420 or 620, or UE wireless communication manager 750, described with reference to FIG. 4, 6, or 7, or the service manager 645 described with reference to FIG. 6.

At block 1115, the UE may identify inclusion of a cell on the sub-optimal cell list, as described herein. The cell may be associated with a cell access procedure initiated for the service initiated at block 1110. Operation(s) at block 1115 may be performed using the wireless communication manager 420 or 620, or UE wireless communication manager 750, described with reference to FIG. 4, 6, or 7, or the cell access manager 650 described with reference to FIG. 6.

At block 1120, the UE may access the cell included in the sub-optimal cell list based at least in part on inclusion of the service in the priority service exception list, as described herein. In some examples, accessing the cell may include camping on the cell in an idle state. Operation(s) at block 1120 may be performed using the wireless communication manager 420 or 620, or UE wireless communication manager 750, described with reference to FIG. 4, 6, or 7, or the cell access manager 650 described with reference to FIG. 6. In some examples, accessing may include initiating access and/or successfully accessing. In some examples, accessing the cell may be further based at least in part on non-receipt of system information from a network indicating access to the cell is barred, the UE operating in a limited service mode, a USIM of the UE being invalidated for EPS services, and/or non-availability of an alternative cell.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Such means may be included in and/or be one or more components illustrated in the Figures. Generally, where there are operations illustrated in Figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media (e.g., a computer program product) includes both computer storage media and communication media, including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of one or more instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The steps of a method or algorithm described in connection with the present disclosure may be embodied directly in hardware, in a software module executed by a processor, or in a combination of the two. A software module may reside in any form of storage medium that is known in the art. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at a user equipment (UE), comprising:
    determining, at the UE, that a cell classifies as sub-optimal based at least in part on determining, at the UE, that a multiple-input multiple-output (MIMO) capability is not supported at the cell, a carrier aggregation (CA) capability is not supported at the cell, or a combination thereof;
    updating, at the UE, a sub-optimal cell list with a physical cell identifier (PCI) of the cell based at least in part on the UE determining that the cell classifies as sub-optimal;
    identifying, by the UE, the PCI of the cell from a signal received from the cell; and
    avoiding a cell access procedure for the cell based at least in part on inclusion of the identified PCI in the sub-optimal cell list.

2. The method of claim 1, wherein the UE determines that the cell classifies as sub-optimal based at least in part on:
    statistical information collected for one or more cells at the UE over time, crowd-sourced information received for one or more cells at the UE, a performance metric determined for one or more cells by the UE, a speed test performed for one or more cells by the UE, or a combination thereof.

3. The method of claim 1, further comprising:
    identifying a network operator associated with the cell;
    wherein avoiding the cell access procedure for the cell is further based at least in part on association of the sub-optimal cell list or one or more identifiers in the sub-optimal cell list with the network operator.

4. The method of claim 1, further comprising:
    identifying a subscriber identity module (SIM) associated with the cell access procedure;
    wherein avoiding the cell access procedure for the cell is further based at least in part on association of the sub-optimal cell list with the SIM.

5. The method of claim 1, further comprising:
    identifying a geographical region in which the cell access procedure is initiated;
    wherein avoiding the cell access procedure for the cell is further based at least in part on association of the sub-optimal cell list or one or more identifiers in the sub-optimal cell list with the geographical region.

6. The method of claim 1, further comprising:
    identifying a radio access technology (RAT) associated with the cell access procedure;
    wherein avoiding the cell access procedure for the cell is further based at least in part on association of the sub-optimal cell list with the RAT.

7. The method of claim 1, further comprising:
    barring access to cells associated with the PCI, for a period of time, upon avoiding the cell access procedure.

8. The method of claim 1, further comprising:
    accessing the cell based at least in part on determining that the sub-optimal cell list does not include the identified PCI of the cell, or that a priority service exception list includes the identified PCI of the cell.

9. The method of claim 1, wherein the cell access procedure comprises one of:
    an initial access procedure, a high priority public land mobile network (HPPLMN) scan, a manual public land mobile network (PLMN) scan, a manual PLMN selection, a manual closed subscriber group (CSG) selection, a network-initiated cell redirection, a UE-initiated cell redirection, a cell search, or camping on the cell in an idle state.

10. The method of claim 1, wherein determining that the cell classifies as sub-optimal is further based at least in part on determining, at the UE, that at least one of a service, a service level, or a combination thereof is not supported at the cell.

11. The method of claim 10, wherein the determining a service level is not supported at the cell comprises determining:
    a throughput or reliability associated with the cell fails to satisfy a first threshold, a radio link failure (RLF) rate associated with the cell satisfies a second threshold, an audio delay or audio jitter associated with the cell satisfies a third threshold, a real-time service delay or jitter associated with the cell satisfies a fourth threshold, or a combination thereof.

12. An apparatus for wireless communication at a user equipment (UE), comprising:
    a processor;
    memory in electronic communication with the processor; and
    one or more instructions stored in the memory and executable by the processor to cause the apparatus to:
        determine, at the UE, that a cell classifies as sub-optimal based at least in part on determining, at the UE, that a multiple-input multiple-output (MIMO) capability is not supported at the cell, a carrier aggregation (CA) capability is not supported at the cell, or a combination thereof;
        update, at the UE, a sub-optimal cell list with a physical cell identifier (PCI) of the cell based at least in part on the UE determining that the cell classifies as sub-optimal;
        identify, by the UE, the PCI of the cell from a signal received from the cell; and
        avoid a cell access procedure for the cell based at least in part on inclusion of the identified PCI in the sub-optimal cell list.

13. The apparatus of claim 12, wherein the UE determines that the cell classifies as sub-optimal based at least in part on:
    statistical information collected for one or more cells at the UE over time, crowd-sourced information received for one or more cells at the UE, a performance metric determined for one or more cells by the UE, a speed test performed for one or more cells by the UE, or a combination thereof.

14. The apparatus of claim 12, wherein the one or more instructions are executable by the processor to cause the apparatus to:
   identify a network operator associated with the cell;
   wherein the one or more instructions to avoid the cell access procedure for the cell are operable based at least in part on association of the sub-optimal cell list or one or more identifiers in the sub-optimal cell list with the network operator.

15. The apparatus of claim 12, wherein the one or more instructions are executable by the processor to cause the apparatus to:
   identify a subscriber identity module (SIM) associated with the cell access procedure;
   wherein the one or more instructions to avoid the cell access procedure for the cell are operable at least in part on association of the sub-optimal cell list with the SIM.

16. The apparatus of claim 12, wherein the one or more instructions are executable by the processor to cause the apparatus to:
   identify a geographical region in which the cell access procedure is initiated;
   wherein the one or more instructions to avoid the cell access procedure for the cell are operable based at least in part on association of the sub-optimal cell list or one or more identifiers in the sub-optimal cell list with the geographical region.

17. The apparatus of claim 12, wherein the one or more instructions are executable by the processor to cause the apparatus to:
   identify a radio access technology (RAT) associated with the cell access procedure;
   wherein the one or more instructions to avoid the cell access procedure for the cell are operable based at least in part on association of the sub-optimal cell list with the RAT.

18. The apparatus of claim 12, wherein the one or more instructions are executable by the processor to cause the apparatus to:
   bar access to cells associated with the PCI, for a period of time, upon avoiding the cell access procedure.

19. The apparatus of claim 12, wherein the one or more instructions are executable by the processor to cause the apparatus to:
   access the cell based at least in part on determining that the sub-optimal cell list does not include the identified PCI of the cell, or that a priority service exception list includes the identified PCI of the cell.

20. The apparatus of claim 12, wherein the cell access procedure comprises one of:
   an initial access procedure, a high priority public land mobile network (HPPLMN) scan, a manual public land mobile network (PLMN) scan, a manual PLMN selection, a manual closed subscriber group (CSG) selection, a network-initiated cell redirection, a UE-initiated cell redirection, a cell search, or camping on the cell in an idle state.

21. The apparatus of claim 12, wherein the one or more instructions are executable by the processor to cause the apparatus to:
   determine that the cell classifies as sub-optimal further based at least in part on determining, at the UE, that at least one of a service, a service level, or a combination thereof is not supported at the cell.

* * * * *